Feb. 9, 1971    F. C. MARINO    3,562,765
RECORDING SYSTEM FOR BUSINESS MACHINES
Filed Jan. 16, 1968    3 Sheets-Sheet 1
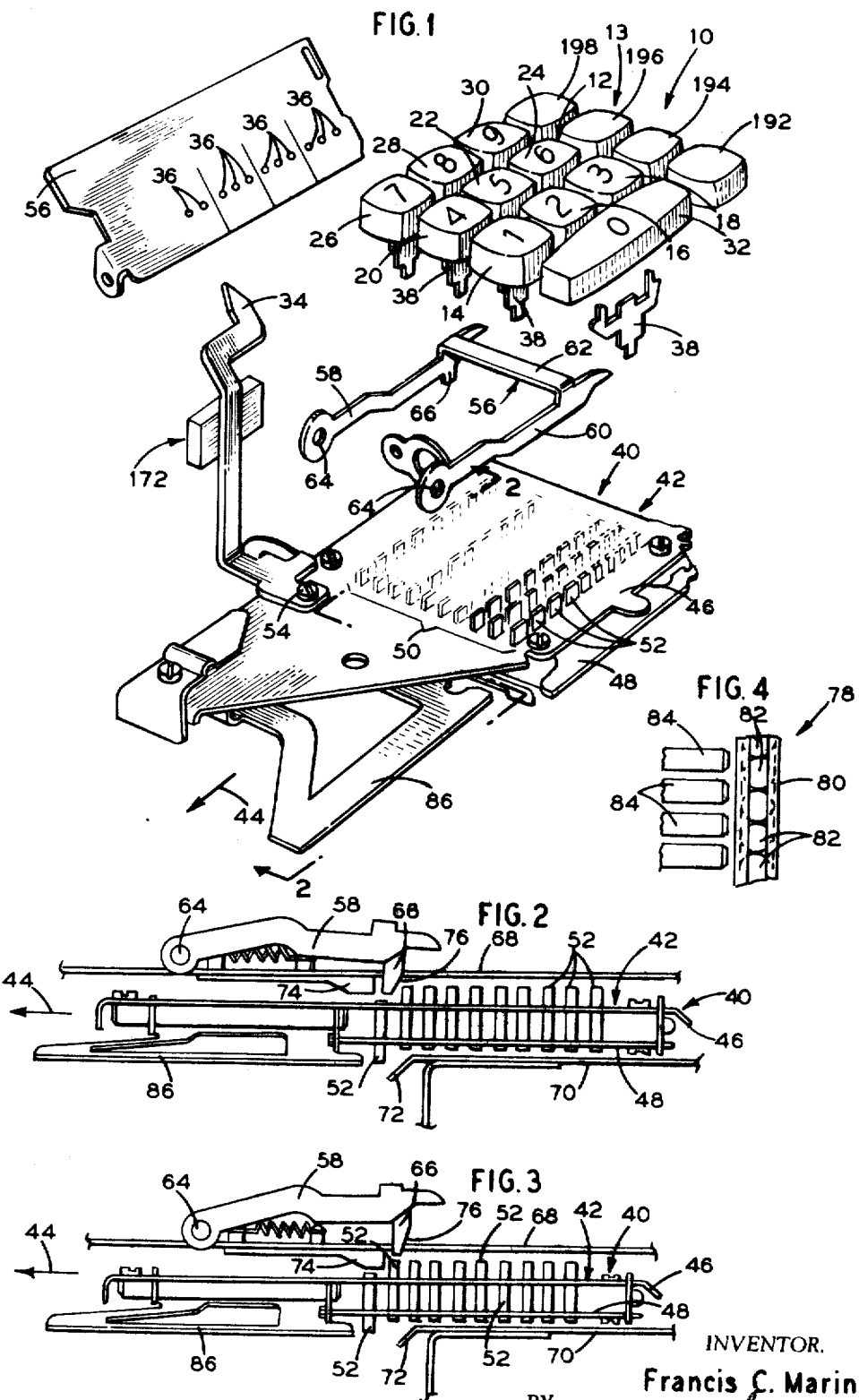

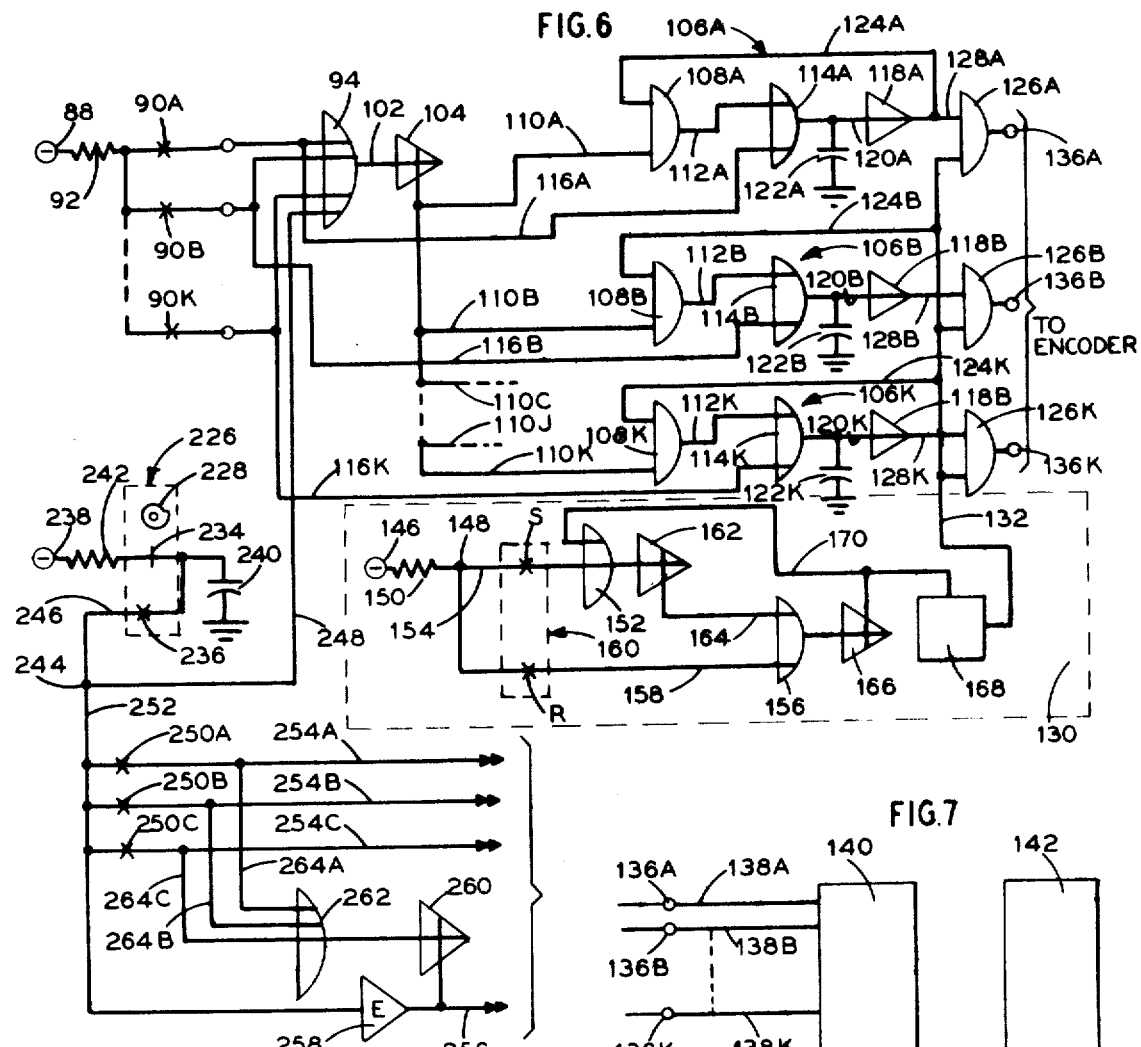
FIG.6
FIG.7
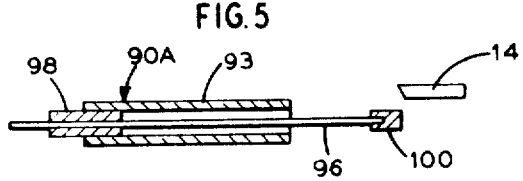
FIG.5

United States Patent Office 3,562,765
Patented Feb. 9, 1971

3,562,765
RECORDING SYSTEM FOR BUSINESS MACHINES
Francis C. Marino, Huntington, N.Y., assignor to Digitronics Corporation, Albertson, N.Y., a corporation of Delaware
Filed Jan. 16, 1968, Ser. No. 698,302
Int. Cl. G11b 13/00
U.S. Cl. 340—172.5                                            14 Claims

ABSTRACT OF THE DISCLOSURE

A data recording system for a keystroke operated business machine for recording the character entries and the functions performed by the machine in a form presentable to a computer and the like. The system includes a plurality of storage means for storing respective signals which are indicative of the character entered into the machine and sampling means for sensing the plurality of storage means signal to produce a recording signal only after the business machine has been mechanically committed to enter the identical character. Hence, a direct correspondence is maintained between the character entered into the machine and the record of such entry.

---

The present invention relation generally to recording systems and, more particularly, pertains to a recording system which is adapted to be used in conjunction with a business machine for recording entries made in the machine on an appropriate medium.

Direct data communication between machines such as computers and the like is becoming more widespread as methods and facilities for accomplishing substantially error-free transmission of data is expanded. For example, the telephone utilities presently provide facilities for the transmission of data between machines over existing telephone lines. This service has been found to be particularly useful to those companies having a central office and a number of subsidiary or branch offices separated by relatively large distances. To be more specific, a computer may be located at the main or central office of a multi-office company. Data, such as accounting data or the like, is transmitted to the central computer from the branch or subsidiary offices. This procedure results in a tremendous economic saving in cost of equipment since only one centrally located computer is required rather than a plurality of computers, each one of which is located at a different branch office.

Presently, in order to take advantage of the communication system described above, conventional business machines such as adding machines, comptometers and the like are being provided with recording systems for simultaneously converting and recording the information entered into such business machines into data signals which may be applied to a computer. Thus, the complete bookkeeping records of a branch office may be fed directly into a central computer so that the complete accounting picture of the entire organization may be had in a minimum period of time.

In light of the above, it is obvious that a direct identity must be maintained between each character entered into the business machine and the corresponding character recorded in the recording device. Thus, it is desirable to actuate the recording apparatus only after the machine has been mechanically committed to enter a character. In keystroke operated business machines having movable carriages this requirement presently is accomplished by providing a switch or a similar device which is operated in response to the carriage movement. However, it has been found that such movement-responsive devices have a number of drawbacks.

For example, in view of the fact that the operator may rapidly strike the keys of the machine, it is highly desirable that the switch operate in the shortest possible time after movement of the carriage has been initiated. Accordingly, this requires critical adjustment of the switch which, inherently, is an extremely time consuming operation which substantially increases the cost of the machine. Additionally, time delay circuits are required to render the switch inoperative as the carriage returns to its rest position during a function cycle to prevent the recording of incorrect data. A further disadvantage resides in the fact that contact bounce has been found to cause errors in the recorded data.

Accordingly, an object of the present invention is to provide a recording system for business machines for recording the operations of a machine in data form which substantially eliminates any discrepancies between the machine entries and the recording device entries.

A more specific object of the present invention resides in the novel details of construction which provide a recording system for a keystroke operated business machine of the moving carriage type which is operable to generate a recording signal independently of the time required for the carriage movement.

A further object of the present invention is to provide a recording system of the type described which produces a reliable recording signal albeit contact bounce occurs in the switch arrangement.

Another object of the persent invention is to provide a recording system for business machines which is reliable in operation and economic to fabricate.

Accordingly, a system constructed in accordance with the present invention includes a recording means for recording the operation of character keys in a keystroke operated business machine. The system further includes individual storage means being movable from a first to a second state in response to the operation of the associated character key. A different output terminal is connected to the output of the respective storage means. Sensing means is provided which is responsive to the movement of the carriage for sensing the state of each of the storage means and for producing an output signal at the output terminal associated with the storage means in said second state. It is to be noted that the sensing means is operable only after movement of the carriage has been initiated. This construction assures that the recording device will remain inoperative until the business machine has been mechanically committed to enter the identical character.

Other objects and advantages of the present invention will become more apparent from a consideration of the following detailed description when taken in conjunction with the accompanying drawings, in which:

FIG. 1 is an exploded perspective view of a portion of the elements comprising the memory and indexing means of a conventional adding machine;

FIGS. 2 and 3 are front elevational views of the indexing means as seen looking in the direction of line 2—2 of FIG. 1, illustrating the sequential operation of the elements which control the movement of the carriage shown in FIG. 1;

FIG. 4 is a top plan view of an interlock mechanism, with parts broken away;

FIG. 5 is a vertical sectional view of a coaxial switch;

FIGS. 6 and 7 are schematic logic diagrams of the recording system of the present invention;

Figure 8:
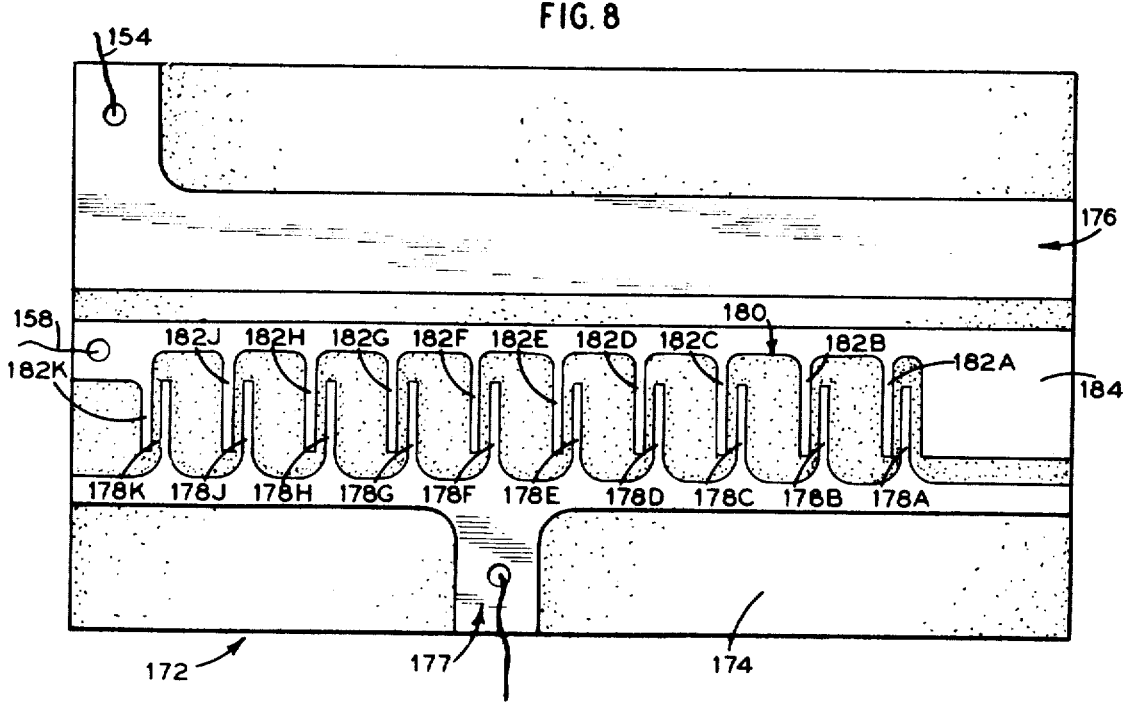
FIG. 8 is a front elevational view of the commutator portion of the sampling switch of the recording system of the present invention.

As noted hereinabove, the recording system of the present invention is ideally suited for use in conjunction with any type of conventional keystroke operated business machine having a movable carriage for recording the character entries and functions performed by the machine during a cycle of operation. However, for purposes of illustration, the device of the present invention will be described in conjunction with the operation of an adding machine and, in particular, the Odhner Electric Adding Machine Model X–9, which is manufactured by the Aktiebolaget Original Odhner, Gothenburg, Sweden, the operation of which is described in the manufacturer's publication entitled "Handbook/Facit X." The construction of this machine is representative of the construction of many keystroke business machines presently commercially available and only those portions of the machine which are pertinent to a clearer understanding of the recording system of the present invention will be disclosed. If the reader wishes to obtain more information on this device other than what is described herein, he is referred to the publications of the Odhner Corporation, such as Service Manual MEK–12, dated 1964, pages 1, 2, 5 and 11, and the catalogue of spare parts DEL–A–12, dated 1962, pages 1, 3 and 7. It is emphasized that the adding machine referred to is for illustrative purposes only and is not to be interpreted as being a limitation on the present invention. That is, the recording system of the present invention may be utilized with any type of keystroke operated business machine which incorporates a movable carriage.

In order to facilitate an understanding and an appreciation of the operation of the recording system of the present invention, the operation of the adding machine is presented first. This is followed by a detailed description of the recording system per se.

Accordingly, FIG. 1 illustrates a portion of an adding machine which is designated generally by the reference numeral 10. The adding machine 10 includes a keyboard having a plurality of character keys designated generally by the reference numeral 12 and a plurality of function keys 13. As is conventional with machines of this type, there are ten character keys 14–32 which respectively represent the digits "1–0." The character keys 12 may be individually and selectively depressed to an operated position to cause the corresponding selected digits to be entered into the machine. On the other hand, the function keys 13 may be individually and selectively depressed to cause the machine to perform specific functions, such as an add function, a subtract function, or to produce a subtotal and the like, in a well known manner. A window (not shown) is usually provided on the front panel of the machine and a column indicator 34 is visible through this window. The column indicator 34 is stepped into alignment with indicia 36, in the manner indicated below, to indicate into which column the particular digit is being entered (i.e., the units column, the tens column, the 100's column, etc.).

The machine 10 is adapted to produce a paper tape record, not shown, of the various entries introduced into the machine. This record or printed hard copy allows the operator of the machine to have an instantaneous record of the characters entered into the machine and the totals, subtotals, etc. of these characters as the case may be. Since the operation of the paper tape portion of the machine 10 is not pertinent to an understanding of the present invention, it will not be discussed herein.

The character keys 14–32 include finger pieces, each one of which has a different digit etched on the upper surface thereof, corresponding to the digit represented by that individual key. For example, the finger piece of the key 14 bears the numeral or digit "1" thereon. Accordingly, the depression of this particular character key will cause a digit "1" to be entered into the machine 10. Depending from each one of the character keys 12 is a leg member 38 which is connected, by an appropriate linkage mechanism (not shown) to a memory or registry device which is described in detail below. Thus, then one of the character keys 14–32 is depressed, the digit represented by that particular character key will be entered into the memory device. When the addition function key is then operated, for example, the number represented by the digits preserved in the memory device will be printed out on the paper tape in a conventional manner. Additionally, the number will be entered into the machine store (not shown) which accumulates the sum of the numbers entered into the machine and which prints out this accumulated sum during a total or subtotal function.

The memory or registering device is designated generally by the reference numeral 40 and includes a carriage 42 which is movable in the direction indicated by an arrowhead 44. The carriage 42 includes an upper plate 46 and a lower plate 48 which support a plurality of longitudinally spaced columns 50 of ten transversely spaced memory or register pins 52 which are adapted to be moved from a rest position to an operated position to register the entry of a character into the machine 10. The columns 50 correspond in number to the number of columns of digits which may be entered into the machine 10. For example, the left-hand column 50 corresponds to the first column of digits which are entered into the machine (i.e., the units column). On the other hand, the right-hand column 50 represents the last column of digits which would be entered into the machine 10.

The first nine memory pins 52 in any one of the columns 50 respectively correspond to the digits "0–8" represented by the respective character keys 32 and 14–28. In the particular example illustrated, there is no memory or register pin 52 which corresponds to the digit or numeral "9." Accordingly, the absence of an operated pin 52 in a column 50 will indicate that the numeral "9" has been entered into the machine for that particular column, as noted in detail below.

The linkage mechanism which connects the character keys with the memory device 40 normally overlies the first column 50 (the left-hand column as taken in FIG. 1) which corresponds to the units column of digits. As each digit is entered into the machine 10 to produce a row of digits corresponding to the desired number, the carriage 42 is stepped from one column position to the next. That is, as a digit is entered in one column 50 the carriage 42 is stepped so that the next column 50 underlies the linkage mechanism.

As indicated hereinabove, the particular column into which a digit is being entered is indicated by the column indicator 34 which is fixedly connected to the carriage 42 by a fastening means such as a screw 54. A column indicating plate 56 is provided with a plurality of dots 36 or other indicia, as noted above, to indicate the particular column into which the digit is being entered. To be more specific, ten dots 36 are provided on the plate 56 corresponding to the ten digits which may be entered in a row to represent a desired number. For example, if the indicator 34 is aligned with the third dot 36 from the right-hand edge of the plate 56, the operator will be advised that the digit which he is about to enter into the machine 10 by depressing one of the character keys 14–32 will be entered into the hundreds column of figures.

The indexing of the carriage 42 from one column position to the next is controlled by means of a link designated generally by the reference numeral 56 in FIG. 1, in cooperation with the last or tenth memory pin 52 in each one of the columns 50. More specifically, the operating link 56 includes a rear member 58 and a forward member 60 which are connected by a bridge 62. The members 58 and 60 are pivotally mounted by appropriate pivot pins, not shown, which extend through aligned apertures 64 at the ends of the respective members. Depending from the rear member 58, and spaced from the ends thereof, is an operating cam 66. The cam 66 overlies and is adapted to engage and depress the last pin 52 in the column 50 into which the digit is being entered. It is to be understood that appropriate linkage mechanisms (not shown) are provided between the character keys 12 and the operating lever 56 such that the operating lever 56 will be pivoted to depress the last pin 52 whenever one of the character keys 12 is operated.

FIGS. 3 and 4 illustrate the sequential operation of the elements which control the stepping of the carriage 42 from column position to column position. Thus, the carriage is normally received between an upper mounting plate 68 and a lower mounting plate 70, both of which are supported in the machine 10 by appropriate brackets (not shown). The lower plate 70 terminates in a downwardly and outwardly inclined surface 72 which extends beyond the first column of pins 52 when the carriage 42 is in position to receive an entry in the first or units column. This position of the carriage 42 will be referred to hereinafter as the start position of the carriage. The surface 72 is adapted to engage and move the operated pins 52 back to the rest position when the carriage 42 moves back to the start position during a function cycle.

Depending from the upper mounting plate 68 and spaced beyond the operating cam 66 in the direction of travel of the carriage 42 (as indicated by the arrowhead 44) is a stop 74 which is located directly in the path of travel of the last or tenth row of pins 52. Accordingly, when the carriage 42 is in the start or first column position, the first pin 52 abuts or is engaged with the stop 74. Moreover, the pointer 34 will be aligned with the first indicia element 36. When any one of the character keys 14–32 is depressed to enter a character or digit into the memory device 40, the operating lever 56 will be pivoted downwardly, as shown in FIG. 2, so that the lower edge of the operating cam 66 engages and depresses the last pin 52 in the first column 50 to an operated position.

In the operated position, the depressed pin 52 will be spaced below the lower surface of the stop 74 so that the pin 52 will no longer engage or be engaged by the stop. The carriage 42 will then advance in a direction indicated by the arrowhead 44 under the influence of an appropriate biasing mechanism (not shown) such as a spring or the like, until the next pin 52 engages an inclined cam surface 76 on the depressed operating cam 66. At this point, the carriage 42 will have moved to an intermediate position (i.e., between two adjacent column positions) and the pointer 34 will be located between the two corresponding adjacent dots or indicia 36 to visually indicate to the operator that the carriage 42 is in the so-called intermediate position.

When the operated one of the character keys 16–32 is released, the operating lever 56 pivots back to its original position, as shown in FIG. 3, under appropriate biasing means (not shown) so that the cam surface 76 rides up on the abutting register pin 42. As soon as the operating cam 66 has cleared the top surface of the aforementioned abutting memory or register pin 52, the carriage 42 will be free to move in the direction indicated by the arrowhead 44 until the second pin 52 engages the stop 74, as shown in FIG. 3. Thus, the carriage 42 will have been advanced one full column position so that the pointer 34 will now point to the second indicia means 36 from the right-hand edge of the plate 56 to indicate that the machine 10 is now ready to accept the digit which is to be entered into the second column of figures.

Summarizing the indexing operation of the machine 10, the depression of any one of the character keys 32 and 14–28 will cause the pin 52 corresponding to the digit represented by the operated character key to be moved from its rest to its operated position. Simultaneously, the movement of a character key to its operated position will actuate the link 56 to cause the carriage 42 to advance to the intermediate position. On the other hand, the operation of the character key 30 which represents the digit "9" will cause only the tenth memory pin 52 to be moved to the operated position thereby to index the carriage 42 to the intermediate position. In other words, the carriage 42 will advance a distance less than the spacing between adjacent columns 50. When the operated character key is released, the carriage 42 will advance to the next column position or a distance which will bring the next column 50 beneath the linkage mechanism associated with the character keys so that the next depression of any one of the character keys 14–32 will cause the appropriate digit to be entered into this next column.

In the illustrative business machine under consideration, a mechanical interlock is provided to prevent the entry of more than one digit into a particular column. The interlock is designated generally by the reference numeral 78 in FIG. 4 and comprises a track 80 having a plurality of circular spacers 82 therein. A plurality of fingers 84 are provided which are individually aligned with the space between adjacent ones of the spacers 82. The fingers 84 are normally in spaced relationship to the spacers 82.

Each one of the fingers 84 is connected to a different one of the character keys 14–32 by an appropriate connecting link mechanism (not shown). When a character key is depressed, the finger 84 connected therewith will move forward relative to the spacers 82 and extend between two adjacent spacers. The track 80 and the spacers 82 are sized so that the distance between all the spacers and the end of the track is substantially equal to the width of a single finger 84. Accordingly, when one finger 84 is received between a pair of spacers 82, the spacers will be forced against each other and the end spacers 82 will be forced against the ends of the track. Since each adjacent spacer 82 will be in engagement with the next adjacent spacer no other one of the fingers 84 will be able to advance forwardly. Hence, the interlock 78, in effect, prevents the depression of more than one of the character keys 14–32 at any one time. Moreover, in view of the fact that the memory device 40 is advanced one column position each time a character key is operated, it will be obvious that the interlock 78 is operable to prevent the entry of more than one digit in any one column 50.

When one of the function keys 13, such as an add key, is operated a plurality of sensing fingers (not shown) move transversely with respect to the carriage 42. The sensing fingers are adapted to engage the respective operated memory or register pins 52. The length of movement of the sensing fingers will be dependent upon which pins are operated in the respective columns 50. Depending upon the length of movement of the sensing fingers, the fingers will actuate the machine to print out the digits which have been entered into the memory device 40. Additionally, the memory store of the machine 10 will update the data stored therein in accordance with the number registered in the memory device 40.

To be more specific, if it is assumed that the digits "1" and "0" have been entered in the first two columns of digits, the second pin 52 in the first column 50 and the first pin 52 in the second column 50, will have been moved to the operated position while the carriage 42 will have advanced to the third column position. Hence, the pointer 44 will be aligned with the third indicia means or dot 36. If the function key representing the add function is now depressed, the sensing fingers will move transversely with respect to the carriage 42 so that one sensing finger will engage the second pin 52 in the first column 50 of memory pins and a second sensing finger will engage the first pin in the second column 50 of memory pins. Accordingly, the numeral 10 will be entered on the paper tape and into the memory store of the machine 10 in the conventional manner.

A stop bar 86 is provided which is connected to and movable with the carriage 42. The stop bar 86 is adapted to engage and prevent movement of the sensing or totalizing fingers corresponding to those columns for which no data has been entered. As an example, no data will be entered into the third to the tenth columns when a number is entered into the first two columns 50 only of the memory device 40. The sensing fingers for sensing the operated pins in the third to tenth columns will engage the stop bar 86 and will not move. Hence, no data will be entered into these columns on the paper tape and these columns will remain blank.

Now, having described the features of the adding machine 10 which are pertinent to the character recording portion of a recording system constructed in accordance with the present invention, the system will now be described in detail, reference being had to the description set forth hereinabove to clarify the operation of the sampling switch incorporated in the recording system. The function cycle of the machine will be described below in conjunction with the recording of the functions performed by the machine.

In general, the recording system of the present invention includes a plurality of switches which are individually and selectively operable by respective ones of the character keys to store a signal in that one of a plurality of storage devices which is associated with that particular character key. Sampling means is provided to sense the storage devices to determine which one of the plurality of storage devices contains a signal representative of the operated character key. However, the sampling means is adapted to be operated only after the machine 10 has been mechanically committed to make an entry in the memory device 40, thereby to insure direct correspondence between the machine entry and the recorded entry. The output signal produced by the sampling means is applied to an appropriate encoder to produce a coded signal representative of the digit entered into the machine. This coded signal is then recorded on an appropriate recording medium for later playback to a computer.

More specifically, FIGS. 6 and 7 show a schematic circuit diagram of the recording system of the present invention partially in logical and block form. Accordingly, the recording system includes a pulse source or a source of energy 88 which is adapted to be connected to a buffer or OR gate 94 through a resistor 92 and a plurality of normally open coaxial switches respectively designated 90A–90K (there is no switch 90I) which are selectively and individually operated by the respective character keys 14–32. In practice, the switches 90A–90K are positioned on the machine 10 directly below the finger pieces of the respective character keys 14–32.

To be more specific, the coaxial switch 90A, which is representative of the plurality of coaxial switches, is shown in FIG. 5, and comprises a conducting outer sleeve 93 connected to the buffer 94 and a resilient coaxial inner conductor 96 which is connected to the resistor 92. The conductor 96 is maintained in spaced relationship to the sleeve 94 by an insulating member 98 which is connected to the rear end of the sleeve 94. The end of the conductor 96 carries an insulating member 100 which is positioned below the finger piece of the key 14. When the key 14 is depressed or moved to the operated position, the finger piece will engage and flex the inner conductor 96 so that the conductor contacts the outer sleeve 94 to close the key switch. Accordingly, when the switch 90A is closed, the energy source 88 will be connected to an input terminal of the buffer 94. Hence, an output signal will appear on the output lead 102 of the buffer 94.

It is to be understood that the inner conductor 96 of the respective switches 90B–90K are similarly positioned below the finger pieces of the respective character keys 16–32 so that each one of the switches 90B–90K will be closed in response to the operation of the associated one of the respective character keys. Thus, the depression of any one of the other character keys 16–32 to the operated position similarly will connect the pulse source 88 with an input terminal of the buffer 94 to produce an output signal on the lead 102.

The lead 102 is connected to the input terminals of an inverting amplifier 104. The amplifier 104 produces a signal at its output terminals which is opposite in polarity to the signal applied to its input terminal. For ease of reference, the signal produced by the pulse source 88 will be referred to hereinafter as a logical one signal and a zero level or no signal will be referred to as a logical zero signal. Accordingly, when the logical one signal is applied to the input terminals of the amplifier 104, a logical zero signal will appear at the output terminals. Under normal conditions, however, a logical one signal appears at the output terminals of the amplifier 104.

The output terminals of the inverting amplifier 104 are connected to ten storage circuits designated generally by the references characters 106A–106K. In other words, there is a one-to-one correspondence between the storage circuits 106A–106K and the character keys 14–32. Additionally, each one of the storage circuits 106A–106K is responsive to the movement of a different one of the respective character keys 14–32 to the operated position to store a logical one signal. For example, the character key 14 controls the operation of the storage circuit 106A and the character key 16 controls the operation of the storage circuit 106B, etc.

The storage circuits 106A–106K are identical in construction and therefore only the storage circuit 106A will be described in detail. The corresponding elements in the storage circuits 106B–106K will be designated by a prefix numeral corresponding to the reference numeral of the element in storage circuit 106A and a suffix letter corresponding to the storage circuit in which the element is located.

Accordingly, the storage circuit 106A includes an AND gate or gate 108A, one input terminal of which is connected to the output terminals of the inverting amplifier 104 by a lead 110A. The gate 108A is conventional in construction and is adapted to produce an output pulse when an input pulse appears at each one of the input terminals of the gate. For this reason, the gate 108A may be considered to be a coincidence circuit. To be more specific, the gate 108A will produce a logical one output signal on the output lead 112A when a logical one input signal simultaneously is applied to each input terminal of the gate.

The lead 112A is connected to an input terminal of a buffer 114A. The other input terminal of the buffer 114A is connected to the output side of the switch 90A by a lead 116A. It is to be noted that one input terminal of the buffers 114B–114K of the storage circuits 106B–106K are individually connected to the respective output sides of the switches 90B–90K by respective leads 116B–116K.

The OR gate or buffer 114A is adapted to produce a logical one signal at its output terminal when a logical one signal appears at any one or both of the input terminals. The output terminal of the buffer 114A is connected to the input terminal of an amplifier 118A by a lead 120A. A storage capacitor 122A is connected between the lead 120A and ground. The capacitor 122A is adapted to be charged by the logical one signal appearing on the lead 120A thereby to store the same.

The output terminal of the amplifier 118A is connected to the second input terminal of the gate 108A by a lead 124A. Hence, the output signal appearing at the output terminals of the amplifier 118A will be applied to one input of the gate 108A. The output terminal of the amplifier 118A is also connected to one input terminal of an AND gate or output pulse generator 126A by a lead 128A. The other input terminal of the gates 126A–126K is connected to the output terminal of a sampling pulse generator 130 by a lead 132. The output leads of the respective gates 126A–126K are connected to output terminals 136A–136K, respectively.

The output terminals 136A–136K are connected to an encoder 140 (FIG. 7) by respective leads 138A–138K. The output terminals of the encoder are connected to the input terminals of a recorder 142 by a lead 144. The encoder 140 and recorder 142 together comprise a recording means. The recorder 142 preferably may take the form of a tape deck which records electronic signals in a form presentable for application to a computer input. The encoder 140 is operable to produce different output signals which are representative of the operated storage circuit. For example, if the storage circuit 106A has been operated to store a logical one signal, a signal will appear on the lead 138A after the storage circuits have been sampled. Accordingly, a signal appearing on the lead 138A will indicate that the character key 14 has been moved to the operated position and that the digit "1" has been entered into the machine 10. The encoder 140 will produce an appropriate coded signal representing the digit "1" and apply this signal to the recorder 142 for recording the same. On the other hand, if a signal appears on the lead 138B, the encoder 140 will produce a coded signal corresponding to the digit "2" and apply this signal to the recorder 142. While any type fo recording means which produces a different combinational code of signals depending upon which one of the plurality of input leads is energized may be utilized in conjunction with the present invention, it is contemplated that the encoder and recorder disclosed in copending application Ser. No. 454,473, filed May 10, 1965, entitled: "Data Transmission Apparatus and Methods," be utilized.

The sampling pulse generator 130 includes a source of potential 146 which is connected to a junction 148 through a resistor 150. The source 146 produces a logical one signal. The junction 148 is connected to one input terminal of a buffer 152 by a lead 154. Similarly, the junction 148 is connected to one input terminal of another buffer 156 by a lead 158. Serially connected in the leads 154 and 158 are the set contacts S and the reset contacts R, respectively, of a sampling or commutator switch 160. Connected to the output terminal of the buffer 152 is an inverting amplifier 162. The output terminal of the amplifier 162 is connected to another input terminal of the buffer 156 by a lead 164. The output terminal of the buffer 156 is connected to the input terminal of another inverting amplifier 166. The output terminal of the amplifier 166 is connected to the input terminal of a monostable multivibrator 168 and to the other input terminal of the buffer 152 by a lead 170. The buffers 152, 156 and the amplifiers 162, 166 provide a trigger circuit for the multivibrator 168.

Figure 9:
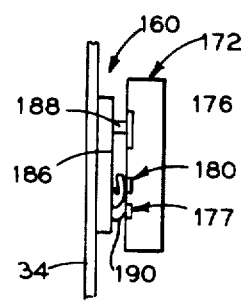
FIG. 9 is a side elevational view of the commutator and brush portion of the sampling switch indicated schematically in FIG. 6.

The sampling or commutator switch 160 is shown in FIGS. 1 and 9 and the commutator board is shown in detail in FIG. 8. The commutator board is designated generally by the reference numeral 172 in the figures and comprises an insulating block 174 which is mounted on the machine 10 by appropriate means (not shown) and is positioned adjacent the movable column indicator 34. An upper continuous conducting bar 176 is positioned on the front surface of the block 174 and is connected to the junction 148. A lower conducting member 177 is similarly positioned on the front surface of the block 174 and includes ten upstanding interconnected conducting fingers or lands 178A–178K (there is no finger 178I), corresponding to the ten column positions of the carriage 42. The conducting member 177 is connected to the input terminal of the buffer 152 shown in FIG. 6. Additionally, an intermediate conducting member 180 is positioned on the front surface of the insulating block 174 and similarly contains ten depending fingers or lands 182A–182K which are interleaved with the respective fingers 178A–178K. Additionally, the conducting member 180 terminates at the right-hand edge of the block 174 in a relatively large terminal area 184. The conducting member 180 is connected to the input terminal of the buffer 156 via the lead 158.

When the member 176 is connected with any one of the fingers 178A–178K the set terminals S will be connected together to apply the source 146 to the input terminal of the buffer 152. On the other hand, when the conducting member 176 is connected with any one of the lands or fingers 182A–182K or area 184 of the conducting member 180, the reset terminals R of the sampling switch 160 will be connected together to apply the source 146 to the input terminal of the buffer 156 via the lead 158. The connection between the conducting member 176 and the conducting member 177 or the conducting member 180 is effected by movement of the column indicator 34 relative to the commutator board 172.

More particularly, as shown in FIG. 9, a block of insulating material 186 is mounted on the column indicator 34. Received on the block 186 is an upper brush 188, which is adapted to engage the upper conducting member 176, and a lower brush 190 which is adapted to sequentially engage the end area 184 and the conducting fingers 182A–182K and 178A–178K as the column indicator 34 is stepped from one column position to the next column position. The brushes 188 and 190 are connected together so that a complete circuit will exist between the junction 148 and the input terminal to the buffer 152 when the brush 190 engages any one of the conducting fingers 178A–178K. In other words, when the lower brush 190 engages any one of the conducting fingers 178A–178K, the set contacts of the sampling switch 160 will be closed to apply a logical one signal to the input terminal of the buffer 152. On the other hand, when the brush 190 engages either the terminal area 184 or any one of the conducting fingers 182A–182K of the conducting member 180, the reset contacts R of the sampling switch 160 will be closed to apply a logical one signal to the input terminal of the buffer 156.

In practice, the brushes 188, 190 are positioned so that at the start position (i.e., the first column position) of the carriage 42, the brush 190 will be in engagement with the terminal area 184 of the conducting member 180 to cause a logical one signal to be applied to the input terminal of the buffer 156 through the R contacts of the sampling switch 160. Additionally, the brush 190 and the conducting fingers 182A–182K are sized and positioned so that the brush 190 will be located between any one of the conducting fingers 182A–182K and the corresponding one of the conducting fingers 178A–178K for any other column position of the carriage 42. Thus, when the carriage 42 advances from one column position to the next adjacent column position, the brush 190 will sequentially engage first one of the fingers 178A–178K to cause the set contacts S of the sampling switch 160 to close and then engage one of the conducting fingers 182A–182K to cause the reset contacts R of the sampling switch 160 to close.

In the operation of the recording system thus far described, it is to be noted that the signal on the lead 102 is initially a logical zero signal. Thus, the inverting amplifier 104 produces a logical one signal on each one of the leads 110A–110K thereby applying a logical one signal to the corresponding input terminal of the respective gates 108A–108K. Additionally, it will be assumed that none of the stored circuits 106A–106K has been actuated to store a logical one signal. Accordingly, a logical zero signal will appear at the other input terminal of each one of the gates 108A–108K. Moreover, it will be assumed that a logical zero signal is applied to the input terminal of the inverting amplifier 162. Accordingly, the output terminal of the amplifier 162 will apply a logical one signal to the buffer 156 via the lead 164. Thus, the inverting amplifier 166 will apply a logical zero signal to both the input terminal of the monostable multivibrator 168 and the input terminal of buffer 152, via the lead 170.

Initially, it is assumed that the character key 14 has been depressed to the operated position to enter the digit "1" in the machine. Accordingly, the initial downward movement of the character key 14 actuates the mechanical interlock 70 in the manner noted hereinabove, to prevent the depression of any one of the other character keys. The continued downward movement of the character key 14 causes the inner conductor 96 of the coaxial key switch 90A associated with the character key 14 to close thereby applying a logical one signal from the energy source 88 to the corresponding input terminal of the buffer 94 and to the buffer 114A via the lead 116A. A logical one signal appears on the output lead 102 thereby causing a logical zero signal to appear at the output terminals of the amplifier 104. Hence, a logical zero signal will be applied to one input terminal of each one of the gates 108A–108K via the respective lead 110A–110K. Thus, the signal appearing on each one of the leads 112A–112K remains a logical zero signal. However, since a logical one signal simultaneously is applied to the buffer 114A, a corresponding logical one signal appears on the lead 120A thereby charging the capacitor 122A. This signal is amplified by the amplifier 118A and a logical one signal appears on the lead 128A and at one input terminal of the gate 108A via the lead 124A.

The continued downward movement of the key 14 causes the second memory pin 52 in a particular column 50 in which the digit "1" is to be entered to be moved to the operated position. When the character key 14 reaches the bottom of its stroke it is released and it returns to the rest position under appropriate biasing means (not shown). During this operation, the carriage 42 moves to the next column position in the manner indicated hereinabove and illustrated in FIGS. 2 and 3.

When the character key 14 moves back to its rest position, the coaxial switch 90A opens thereby removing the logical one signal from the lead 116A and the input terminal to the buffer 94. Accordingly, the signal appearing on the lead 102 returns to a logical zero signal. Therefore, the inverting amplifier 104 produces a logical one signal at its output terminal which is applied to each one of the leads 110A–110K. It is to be noted that a logical one signal now is applied to both terminals of the gate 108A since only the lead 124A of the leads 124A–124K carries a logical one signal. Hence, the logical one signal appears on the lead 112A and, through the buffer 114A, on the lead 120A thereby preventing the capacitor 122A from discharging. Thus, only the lead 128A of the leads 128A–128K carries a logical one signal. In other words, a logical one signal is applied to one input terminal of the gate 126A whereas the corresponding input terminal of the gates 126B–126K carries a logical zero signal. To put this another way, only the storage circuit 106A stores a logical one signal to represent the fact that the character key 14 has been operated to enter the digit "1" into the machine 10.

As the carriage 42 advances from one column position to the next column position, the brush 190 engages the next adjacent one of the fingers 178A–178K to complete a circuit between the conducting members 176 and 177. Hence, the junction 148 is connected to the input terminal of the buffer 152 through the set contacts S of the sampling switch 160, in the manner noted above, to apply the source 146 to the input terminal of the buffer. Accordingly, a logical one signal is applied to the input terminals of the amplifier 162 thereby producing a logical zero signal on the lead 164. Thus, a logical zero signal appears at the output of the buffer 156 thereby producing a logical one signal on the lead 170. This logical one signal is applied to the monostable multivibrator 168 and the input terminal of the buffer 152 to maintain at least one input terminal of the buffer 152 at the level of the logical one signal.

The monostable multivibrator 168 produces a pulse which is applied to one input terminal of each one of the AND gates 126A–126K via the lead 132. However, the gate 126A only is operated to produce a logical one output signal, which appears at the output terminal 136A, and which is applied to the encoder 140 through the lead 138A. Accordingly, the encoder 142 produces and applies a signal representative of the entry of the digit "1" into the machine 10, to the recorder 142 via lead 144. After a predetermined interval of time, the monostable multivibrator 168 returns to its normal state thereby removing the signal on the lead 132.

The continued movement of the carriage 42 to the next column position causes the brush 190 to engage the next adjacent one of the fingers 182A–182K to apply a logical one signal from the junction 148 to the input terminal of the buffer 156 via the reset contacts R of the sampling switch 160 and the lead 158. This signal is applied through the buffer 156, to the input terminals of the amplifier 166 thereby producing a logical zero signal on the lead 170.

It is emphasized that this particular design of the commutator board 172 prevents the generation of spurious signals even though one hundred percent contact bounce may occur. To be more specific, the spatial displacement between the fingers 182A–182K and the respective fingers 178A–178K insure that the set contacts S and the reset contacts R of the switch 160 cannot close simultaneously since the brush 190 can engage one finger only at any one point in its travel across the board. For example, if the brush 190 engages the finger 178C twice due to contact bounce, the sampling circuit 130 will remain undisturbed since this action simply will result in both inputs to the buffer 152 carrying a logical one signal. In other words, the reset contacts R (i.e., one of the fingers 182A–182K) of the switch 160 must be engaged before the multivibrator 168 can be retriggered.

If it is assumed that a digit other than the digit "1" now is entered into the machine 10, the movement of this next character key to the operated position closes the corresponding coaxial switch to apply a logical one pulse or signal to the input terminal of the buffer 94. Hence, a logical zero signal appears on the lead 110A in the manner noted hereinabove. The logical one signal on the lead 112A therefore is removed. Moreover, the signal on the lead 116A remains a logical zero since the switch 90A remains open. Accordingly the signal on the lead 120A becomes a logical zero thereby permitting the capacitor 122A to discharge. Hence, the signal on the lead 128A becomes a logical zero signal while the signal on one of the leads 128B–128K becomes a logical one signal depending upon which one of the character keys has been operated.

For example, if the character key 16 has been operated, a logical one signal will appear on the lead 128B since the operation of the storage circuit 106B to store a logical one signal corresponds to the entry of the digit "2" into the machine 10. The movement of the carriage 42 to the next column position will cause a pulse to be applied to one input terminal of the gates 126A–126K via the lead 132 in the manner indicated above. However, since no logical one signal is applied to the lead 128A, no output signal will appear at the output terminal of the AND gate 126A. On the other hand, the logical one signal will appear at the output terminal of that AND gate having both input terminals at the logical one level. In the example chosen, a logical one signal will appear at the output terminal 136B.

It is emphasized that the only time an entry is made in the recorder 142 is after the machine 10 has been mechanically committed to enter a digit. To put this in another way, if the character key is released before it reaches a mechanical commitment level, the carriage 42 will not move and, consequently, the sampling switch 160 will remain inoperative. Accordingly, a direct correspondence between the digits entered into the machine 10 and the digits recorded in the recorder 140 always will be maintained.

It is also to be noted that only one pulse will be produced each time the carriage is stepped from one column position to another column position. Hence, only one digit entry will be recorded for each mechanical entry of the machine 10 irrespective of irregularities in the keystroke of any particular one of the character keys 12. Moreover, the operation of the system will be independent of the carriage position or velocity whence the particular storage circuit 106A–106K associated with the operated character key will store the logical one signal in response to the operation of the associated key and independent of the carriage movement. Hence, the pulse from the network 130, which includes the monostable multivibrator 168 which produces the sampling pulse to sense the storage circuits, may occur any time after a logical one signal has been stored in the storage circuit.

The machine 10 also includes function keys 13 (FIG. 1) such as an add key 192, a subtract and totalizing key 194, a correction key 196, and a non-add key 198. When any one of these keys is depressed, the machine performs the function called for by the depressed key. For example, if the add key 192 is depressed, the machine adds the number entered into the memory device 40 of the machine to the memory store of the machine. If the subtract and totalizing key 194 is then depressed, the machine will be actuated to print out the sum of all of the numbers which have been entered into the machine up to that point on the paper tape.

Figure 10:
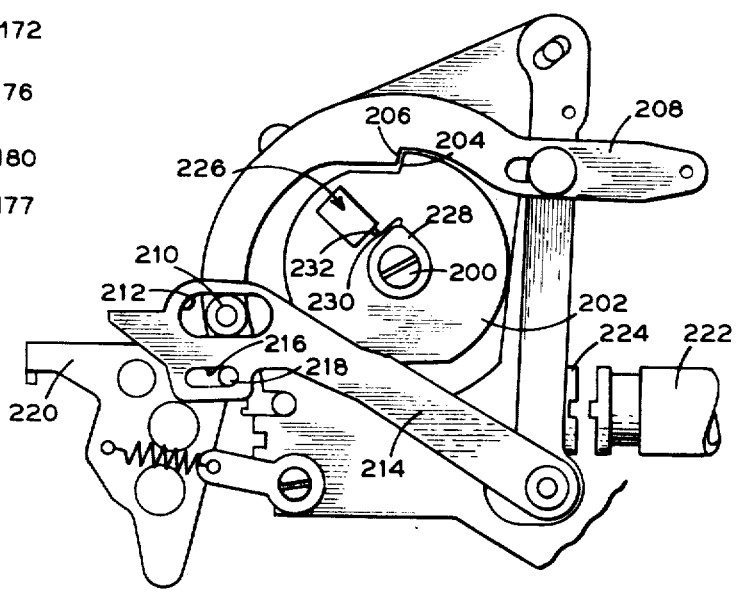
FIG. 10 is a perspective view of the function key escapement mechanism of a conventional business machine.

When any one of the function keys 192–198 is depressed or operated to cause the machine 10 to initiate a function cycle, a drive shaft is caused to rotate which operates the print wheels (not shown) of the machine to print a number on the paper tape and to advance the paper tape. The pertinent portion of the function cycle mechanism is shown in FIG. 10 and includes a drive shaft 200 which mounts a gear 202 having a tooth 204 located in the peripheral wall of the gear. The tooth 204 is adapted to be engaged by a radially inwardly notched surface 206 on an arm 208 which is pivotally mounted on the machine 10. Mounted on the arm 208 is a roller 210 which is received within an elongated slot 212 in a starting arm 214. A second elongated slot 216 is positioned below the slot 212 and slidably receives a pin 218 which is connected to a starting bridge 220.

When the subtract and totalizing key 194 is depressed, an appropriate linkage causes the arm 208 to pivot in a direction which causes the projection 204 to disengage itself from the tooth 206 on the gear 202. Accordingly, the drive shaft 200 now will be free to rotate. Additionally, the movement of the arm 208 to a disengaged position causes the starting arm 214 and the starting bridge 220 to similarly pivot by reason of their engagement with the arm 208, thereby to energize a motor (not shown) and to connect the motor shaft 222 with a gear 224 which, in turn, is connected to the drive shaft 200 through an appropriate gearing mechanism. Thus, the machine 10 will then perform a subtraction or a totalizing function, as the case may be.

As the gear 202 rotates through a revolution, the arm 208 assumes its normal position so that the projection 206 is again positioned in the path of the tooth 204. As the gear 202 completes its revolution, the tooth 204 again engages the projection 206 to limit the rotation of the drive shaft 200 to one complete revolution only. Hence, it will be noted that the drive shaft 200 makes one complete revolution each time the machine 10 is actuated to perform one of its functions (i.e., to through a print cycle).

The system of the present invention includes a function cycle switch 226 which is connected to the machine 10 by appropriate means (not shown) and it is positioned adjacent to the drive shaft 200. Affixed to the drive shaft 200 is an eccentric cam 228. The high point 230 of the cam 228 is adapted to engage a movable button 232 which projects into the path of movement of the cam 228 as the cam rotates through a revolution.

The function cycle switch 226 includes normally closed contacts 234 and normally open contacts 236 (FIG. 6). Movement of the button 232 by the cam 228 causes the contacts 234 to open and the contacts 236 to close. To be more specific, the function cycle switch 226 is actuated each time the machine 10 performs a function such as an add function, a subtract function and the like, to open the normally closed contacts 234 and close the normally open contacts 236.

The function cycle recording portion of the system of the present invention further includes a pulse source 238 which is connected to a capacitor 240 through a resistor 242 and the normally closed contacts 234 of the function cycle switch 226. The capacitor 240 also may be connected to a junction 244 through the normally open contacts 236 of the function cycle switch 226 by a lead 246. The junction 244 is connected to one input terminal of the buffer 94 by a lead 248. One side of normally open coaxial switches 250A–250C, which are operable by the movement of the respective add key 192, the subtract and totalizing key 194 and the correction key 196 to the respective operated position, is connected to the junction 244 by a lead 252. The other side of the switches 250A–250C are connected to the encoder 140 by respective leads 254A–254C. The switches 250A–250C are identical in construction to the switches 90A–90K.

When a pulse appears on any one of the leads 254A–254C the encoder 140 will be actuated to produce a coded signal which is indicative of the function key which has been depressed, and therefore produces a record in the recorder 142 of the function performed by the machine.

The operation of the non-add key 198 causes the digits which are mechanically entered into the memory device 40 of the machine 10 prior to a non-add function cycle to be entered on the paper tape without being entered into the memory store of the machine. No electrical coaxial switch is associated with the non-add key 198. However, if a pulse appears on a lead 256, the encoder 140 will produce a signal representative of a non-add function performed by the machine.

More particularly, the lead 256 is connected to the junction 244 through a normally "on" emitter follower 258. Additionally, the lead 256 is connected to the output terminal of a normally cut-off inverting amplifier 260. Hence, the potential on the lead 256 will correspond to a logical zero signal. The input terminals of the inverted amplifier 260 are connected to the output terminals of a buffer or OR gate 262, the input terminals of which are connected to the leads 254A–154C by respective leads 264A–164C.

In operation, assuming that the totalizing key 194 is depressed, the key switch 250A will be closed to connect the lead 254 with the junction 244. Additionally, a totalizing function cycle will be initiated in the machine to cause the drive shaft 200 to rotate through a revolution in the manner described above, thereby causing the cam 228 to engage the button 232 of the function cycle switch 226. Initially, it is to be noted that the source 238 is connected to the capacitor 242 through the closed contacts 234 of the switch 226. Hence, the capacitor 240 will charge to the potential of the source 238. However, when the function cycle switch 226 is operated, the contacts 234 will open and the contacts 236 will close, thereby allowing the capacitor to discharge and produce a signal on the lead 254A which is representative of a logical one signal. The appearance of a pulse on the lead 254A causes the encoder 140 to produce a coded signal representative of the totalizing function performed by the machine. This coded signal is then applied to the recorder 142 through the lead 144 to produce a record of the totalizing function performed by the machine.

Additionally, the logical one pulse appearing at the junction 244 will be applied to one input terminal of the buffer 94 through the lead 248. Thus, the output terminal of the inverting amplifier 104 will produce a logical zero signal, in the manner indicated hereinabove, thereby to disable each one of the storage circuits 106A–106K. Moreover, this operation permits the discharge of any one of the capacitors 122A–122K if one of the storage circuits had been actuated on the previous operation of the machine 10 to store a logical one signal.

It is to be noted that the appearance of a pulse on the lead 254A will produce a logical one signal at the input terminals of the inverting amplifier 260 through the buffer 262. Hence, a logical zero signal will be maintained on the lead 256. Similar comments apply if the add key 192 or the correction key 196 are operated.

On the other hand, if the non-add key 198 is depressed, the function cycle will be initiated thereby causing the capacitor 240 to discharge through the contacts 236 of the switch 226. However, since the switches 250A–250C are open at this time no pulse will be applied to the input terminals of the inverting amplifier 260 and the amplifier will remain in cut-off. Since the emitter follower 258 is now driven to cut-off by the pulse applied to its input terminals, a negative pulse representing a logical one signal appears on the lead 256. This signal causes the encoder 140 to produce a signal representative of the non-add function performed by the machine 10. This signal is then applied to the recording apparatus 142 in the conventional manner.

At the termination of the function performed by the machine 10, the carriage 42 is returned to its normal or start position by appropriate means, not shown, and the column indicator 34 is aligned with the first indicia 36 on the plate 56 to indicate the machine is now ready to accept another line of numbers. As the carriage moves back to its normal position in a direction opposite to that indicated by the arrowhead 44 in FIGS. 2 and 3, the operated memory pins 52 are engaged by the inclined surface 72 of the lower plate 70. Thus, the operated pins 52 are cause to move upwardly due to the inclination of the member 72 so that all the memory pins 52 are restored to their rest position. It will be obvious that as the carriage 42 is restored to its rest position, the brush 190 sequentially engages contact fingers 178A–178K and 182A–182K. However, since the storage circuits 106A–106K are disabled during the time that the machine is going through a function cycle by the pulse appearing on the lead 248, no signal appears at any one of the output terminals 136A–136K.

Accordingly, a recording system for a keystroke operated machine has been provided in which a character is entered in the recording system only after the machine has been committed mechanically to enter the same character, thereby to insure correspondence between the machine entry and the recorded entry. Additionally, the operation of the recording system of the present invention is independent of carriage displacement or velocity thereby eliminating the need for critical adjustment of the commutator board comprising a portion of the sampling switch of the present invention.

While a preferred embodiment of the invention has been shown and described herein it will be obvious that numerous omissions, changes and additions may be made in such embodiment without departing from the spirit and scope of the present invention.

What is claimed is:

1. A recording system for recording the operation of a business machine adapted to perform preselected operations on characters entered into the machine, said business machine being of the type having a plurality of selectively and individually operable character keys respectively representing predetermined characters, a carriage movable between a plurality of column positions, a plurality of longitudinally spaced columns of memory means on said carriage responsive to the operation of the respective character keys for storing the characters entered into the machine, and indexing means operable to advance said carriage from one column position to another column position after a character has been entered into the memory means; said recording system including individual storage means for at least preselected ones of the character keys for producing a first signal in response to the operation of the associated character key, a respective output terminal for each of said storage means, sensing means operable in response to the advancement of the carriage from one column position to another for producing a second signal at the output terminal associated with that one of said storage means producing said first signal and recording means responsive to said second signal for producing a coded signal representative of the character entered into the memory means and for recording said coded signal.

2. A recording system as in claim 1, in which said sensing means includes sampling means for generating a sampling signal in response to the movement of said carriage, and a respective output means connected to each one of said storage means and to said sampling means for generating said second signal in response to the application of said first and sampling signals thereto.

3. A recording system as in claim 2, in which said output means comprise respective coincidence circuits for producing said second signal in response to the simultaneous application of said first and sampling signals thereto.

4. A recording system as in claim 2, in which said sampling means includes pulsing means operable to produce said sampling signal, a source of energy, and a sampling switch operable in response to the movement of said carriage for connecting said source of energy to said pulsing means to operate said pulsing means.

5. A recording system as in claim 4, in which said pulsing means comprises a multivibrator responsive to a trigger signal for producing said sampling signal, and a trigger circuit having first and second input terminals and being operable from a first to a second state to produce said trigger signal, said trigger circuit being responsive to a source of energy applied to said first input terminal to move from said first to said second state and being responsive to a source of energy applied to said second input terminal to move from said second to said first state, and a sampling switch having contacts adapted to connect sequentially said source of energy with said first and second input terminals as the carriage moves from one column position to another.

6. A recording system as in claim 1, in which each one of said storage means includes disabling means for disabling said storage means to remove said first signal in response to the operation of a character key not associated with said one storage means.

7. A recording system as in claim 1, in which said storage means includes a pulse generator for producing a pulse in response to the operation of a character key, disabling means responsive to a pulse from said pulse generator for disabling said storage means, and enabling means responsive to a pulse from said pulse generator for producing said first signal regardless of the operation of said disabling means.

8. A recording system as in claim 7, in which said storage means includes switching means for applying said pulse from said pulse generator to each one of said disabling means and to the enabling means of the storage means associated with the operated character key.

9. Recording apparatus for recording the operation of a business machine adapted to receive characters and to perform preselected functions on the entered characters, said business machine including a plurality of character keys respectively representing predetermined characters, said plurality of character keys being individually and selectively movable from an inoperative to an operated position, a carriage movable between a plurality of column positions and normally residing in a first position, a plurality of longitudinally spaced columns of individual memory means for at least preselected ones of said character keys movable from a rest to an operated position in response to the operation of the associated character key to store a character in the column, indexing means responsive to the movement of a character key to the operated position for advancing said carriage to the next column position, and a plurality of function keys individually and selectively operable to operate said machine to sense the operated memory means and to perform the selected function on the characters stored in said columns; said apparatus comprising individual storage means for respective character keys, each of said storage means being movable from a first to a second state in response to the operation of different character keys, a different output terminal for each of said storage means, sampling means responsive to the movement of the carriage for sensing the state of each of said storage means and for producing an output signal at the output terminal associated with said storage means in said second state, and recording means responsive to said output signal for producing coded signals representative of the operated character key and for recording said coded signals to produce a record of the sequential operation of said character keys.

10. Recording apparatus as in claim 9, in which said sampling means includes a sampling pulse generator for producing a sampling pulse, and a different output pulse generator connected between respective ones of said storage means and the associated output terminals, said output pulse generator being responsive to said second state of said storage means and to said sampling pulse to generate said output pulse.

11. Recording apparatus as in claim 10, in which said sampling pulse generator includes a two-state device operable between a first state and a second state in response to input signals to produce said sampling pulse, and input signal means including a switch operable by the movement of the carriage from one column position to another to apply sequentially an input signal to said two-state device to move said two-state device from said first state to said second state and to apply another input signal to said two-state device to move said two-state device from said second to said first state.

12. Recording apparatus as in claim 9, in which said storage means includes disabling means for moving said storage means to the first state, enabling means for moving said storage means to the second state, signal means for operating said enabling and said disabling means, and switching means operable by the respective character keys for connecting said signal means with each of said disabling means and the enabling means of that one of said storage means associated with the operated character key, whereby said one of said storage means is operated to the second state.

13. Recording apparatus as in claim 9, and a function key switch for preselected ones of said function keys operable in response to the operation of the associated one of said preselected ones of said function keys to an operated position, a pulse network, a function cycle switch operable in response to the initiation of a function cycle in the business machine for connecting said pulse network with said function key switches to apply a pulse to said function key switches, and lead means for connecting said function key switches to said recording means.

14. Recording apparatus as in claim 13, and lead means connecting said function cycle switch with said disabling means in each of said storage means for connecting said pulse network with said disabling means upon the operation of said function cycle switch to operate said disabling means.

References Cited
UNITED STATES PATENTS

| | | | |
|---|---|---|---|
| 3,260,340 | 6/1966 | Locklar et al. | 197—19 |
| 3,403,225 | 9/1968 | Mislan et al. | 178—17.5X |
| 3,439,118 | 4/1969 | Howard et al. | 178—17 |
| 3,454,717 | 7/1969 | Peters | 178—17X |

PAUL J. HENON, Primary Examiner

P. R. WOODS, Assistant Examiner

U.S. Cl. X.R.

178—17